United States Patent [19]

Mori

[11] Patent Number: 5,408,676

[45] Date of Patent: Apr. 18, 1995

[54] PARALLEL DATA PROCESSING SYSTEM WITH PLURAL-SYSTEM BUS CONFIGURATION CAPABLE OF FAST DATA COMMUNICATION BETWEEN PROCESSORS BY USING COMMON BUSES

[75] Inventor: Kazutaka Mori, Higashiyamato, Japan

[73] Assignee: Hitachi, Ltd., Tokyo, Japan

[21] Appl. No.: 998,532

[22] Filed: Dec. 30, 1992

[30] Foreign Application Priority Data

Jan. 7, 1992 [JP] Japan .................. 4-018530

[51] Int. Cl.⁶ .............. G06F 13/00; G06F 15/16
[52] U.S. Cl. .................. 395/800; 364/229; 364/229.2; 364/231.9; 364/232.8; 364/259.8; 364/260.1; 364/DIG. 1
[58] Field of Search ............ 395/800; 364/DIG. 1, 364/DIG. 2; 340/825.86

[56] References Cited

U.S. PATENT DOCUMENTS

| | | | |
|---|---|---|---|
| 4,644,496 | 2/1987 | Andrew | 364/900 |
| 4,821,174 | 4/1989 | Webb et al. | 364/200 |
| 4,891,787 | 1/1990 | Gifford | 364/900 |
| 4,973,956 | 11/1990 | Lin et al. | 340/825.86 |
| 5,058,001 | 10/1991 | Li | 364/200 |
| 5,123,109 | 6/1992 | Hillis | 395/800 |
| 5,203,005 | 4/1993 | Horst | 395/800 |
| 5,257,395 | 10/1993 | Li | 395/800 |

FOREIGN PATENT DOCUMENTS

01-320564 12/1984 Japan .
60-196866 10/1985 Japan .
61-148564 7/1986 Japan .
63-098065 4/1988 Japan .

OTHER PUBLICATIONS

C. Chin and W. Lin; IEEE pp. 463–466; "A Massive Parallel Processing System Based on Hyper-Crossbar Network"; 1988.

*Primary Examiner*—Alyssa H. Bowler
*Assistant Examiner*—Meng-Ai An
*Attorney, Agent, or Firm*—Fay, Sharpe, Beall, Fagan, Minnich & McKee

[57] ABSTRACT

In a parallel computer system in which many microprocessor elements are disposed at least in a two dimensional array to communicate data therebetween at a high speed, n bidirectional buses XBi and m bidirectional YBi are respectively arranged in X and Y directions to dispose m by n data processor elements CPUij at intersections of the buses XBi and YBj, thereby connecting these elements respectively to the associated buses XBi and YBj. Each processor element has a unit for selectively establishing a connection between the bus XBi and the bus YBj which are coupled thereto. In a data transfer between two elements sharing neither one of the bidirectional buses in the X and Y directions, there is selected an element which is connected to one of the X-directional-buses linked to one of the elements and which is connected to, one of the Y-directional buses linked to the other one thereof to use the selected element as a relay for establishing a conductive route between the buses.

9 Claims, 13 Drawing Sheets

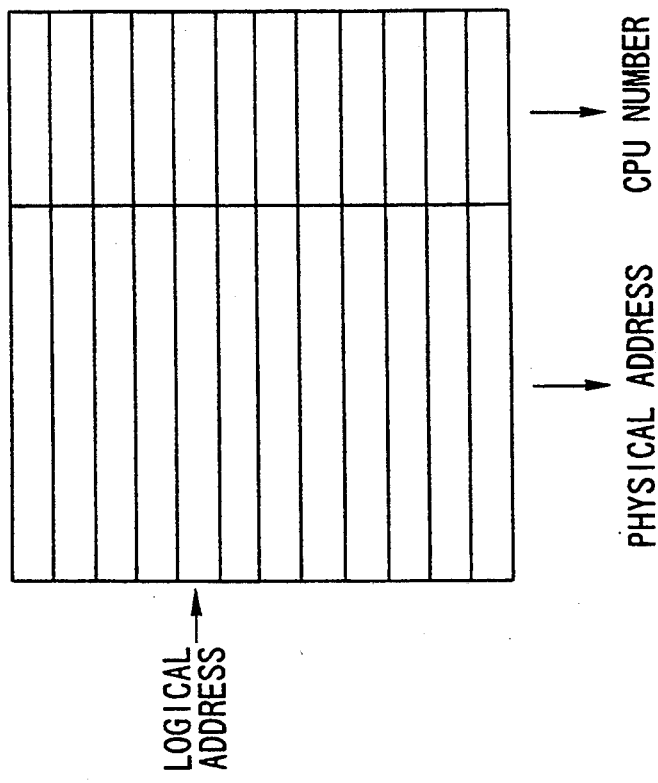
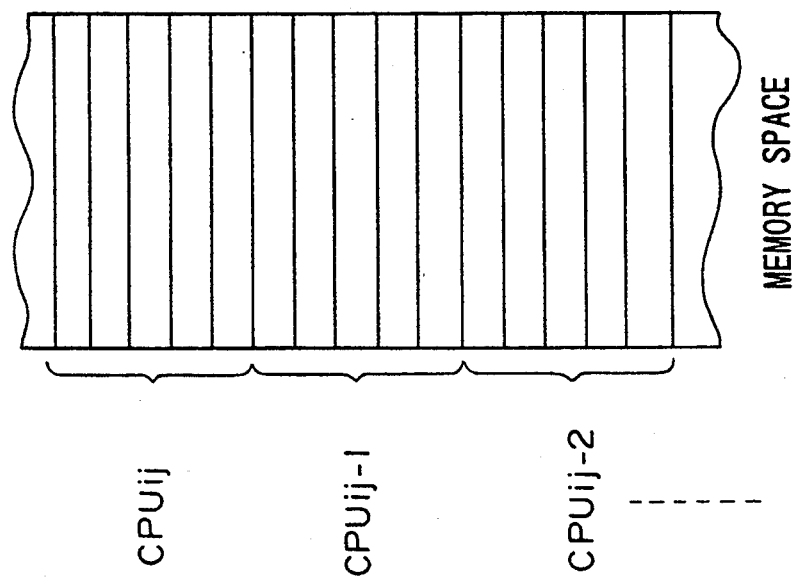

CPU'S MOUNTED ON MULTIPLE LAYERS

CPU'S MOUNTED ON BOTH SIDES

PARALLEL DATA PROCESSING SYSTEM WITH PLURAL-SYSTEM BUS CONFIGURATION CAPABLE OF FAST DATA COMMUNICATION BETWEEN PROCESSORS BY USING COMMON BUSES

BACKGROUND OF THE INVENTION

The present invention relates to a parallel data processor in which a plurality of data processor elements such as microprocessors are organically coupled with each other to achieve parallel data processing and to a microprocessor applicable thereto, for example, to a technology effectively applied to a computer operating at an ultra high speed.

As a method of increasing the processing speed of computers, a technology in which a large number of computer (data processor) elements are arranged to execute parallel operations has developed. In this situation, the processing performance of the overall computer system is determined by the data transfer speed between the computer elements thus arranged in a parallel fashion. For this purpose, a technology of increasing the speed and efficiency of data transfer between plural computer elements disposed in parallel has been described in the U.S. Ser. No. 07/369,252, filed on Jun. 20, 1989 and assigned to the present assignee (JP-A-1-320564) now abandoned. The parallel processor disclosed therein includes a central processing unit (CPU) and microprocessors, each including a local memory, a plurality of ports for establishing connection between the microprocessors, and a path for transferring data selectively from one of the ports to other ports, thereby enabling re-configuration of connections between the respective microprocessors according to a processing method so as to achieve various kinds of processing through parallel operations.

The present inventors have investigated methods of data transfer between a large number of computer elements in more detail and have recognized the following facts. Even when the prior art above is adopted in a parallel computer, for the configuration of connections between the computer elements, there is employed a two-dimensional grid (matrix) connection, a tree connection, or the like. In either case, to a selected one of the computer elements, only two to four computer elements adjacent thereto can be directly connected. In an ultra parallel computer system of a large size in which about 10×10 to about 30×30 computer elements are arranged, for a transfer of data from a computer element to another computer element, it is required to transfer the data via ten to thirty other computer elements. This means that the processing speed and efficiency are limited when processing a great volume of data in the system.

SUMMARY OF THE INVENTION

It is therefore an object of the present invention to provide a parallel data processor in which the speed of data communication between arbitrary data processor elements can be increased and which can increase the processing speed of a large amount of data in an ultra parallel computer.

Another object of the present invention is to provide a microprocessor having a configuration suitably applicable to the parallel data processor.

These and other objects and advantages of the present invention will become apparent by reference to the following description and accompanying drawings.

Representative constitutions of the present invention disclosed in this specification will now be briefly described.

Namely, there is disposed m bidirectional buses in an X direction and n bidirectional buses in a Y direction such that m x n data processing elements are disposed on intersections of the bidirectional buses in an associative manner such that the respective data processor elements are connected to the associated buses arranged in the X and Y directions. Each of the data processor elements includes operating means for achieving an operation according to an instruction, store means for keeping data to be used by the operating means for read and write operations thereof, transfer paths of access information to the store means, a plurality of pairs of external terminal groups for achieving input and output operations of the access information, input/output change-over or switching means for selectively connecting either one of the external terminal groups to the transfer paths and connecting the external terminal group to another external terminal group, and control means for controlling a connection mode by the input/output change-over means, thereby coupling the external terminal group to the X-directional buses and the other external terminal group to the Y-directional buses.

As a method of specifying a data processor element and another data processor element to which data is to be transferred, it is possible for the operating system to exclusively issue an indication of specification to the control means of the destination element. However, to implement the specification control in hardware in a relatively simple fashion, X-control buses are respectively disposed corresponding to the bidirectional X buses and Y-control buses are respectively associated with the bidirectional y buses. Moreover, for each data processor element, in order to specify another data processor element as the data transfer destination, means for generating specification information including information items respectively of X-directional position and Y-directional position of the destination data processor element, specification information output means for supplying the X-control bus with specification information generated by the generating means, and propagation means for selectively propagating to the Y-control bus the information item of the Y-directional position supplied from the X-control bus are provided. In this configuration, the control means need only have a control mode in which when the information item fed from the X-control bus matches the X-directional position assigned to the control means, the control means controls the propagation means to output the information item of the Y-directional position to the Y control bus and supervises the input/output change-over means to propagate the information from the X bus to the Y bus.

According to the specification method, a data processor element is first specified in the X direction and then an objective data processor element is designated via the data processor previously specified. However, in consideration of parallel processing by a large number of data processor elements in which it is desired to increase the data transfer efficiency by possibly avoiding conflict of data transfers on the bidirectional buses, each of the data processor elements need only further include specification information output means for supplying the Y-control bus with specification information created by the specification information generating means and propagation means for selectively propagating to the X-control bus the information of the X-directional position supplied from the Y-control bus. Moreover, the control means additionally need only possess a control mode in which when the information item fed from the Y-control bus matches the Y-directional position assigned to the control means, the control means controls the propagation means to output the information item of the X-directional position to the X-control bus and supervises the input/output change-over means to propagate the information from the Y bus to the X bus.

When the data processor element supports a virtual storage, to simplify the configuration of the means for generating the information specifying the data processor element to which data is to be transferred, it is only necessary to assign mutually different physical addresses to the storage means included respectively in the data processor elements and the specification information generating means need only include an address conversion or translation mechanism to convert a logical address into a physical address. In this structure, the address conversion mechanism need only be constructed to store therein entries, each containing information specifying the physical address associated with the logical address and a data processor element having the store means related to the physical address, thereby outputting the specification information together with the physical address corresponding to the logical address.

According to the means above, between two arbitrary data processor elements commonly connected to either one of the X-directional Y-directional bidirectional buses, data is transferred via the single bidirectional bus shared therebetween. On the other hand, to transfer data between two data processor elements not having such a shared connection therebetween, there is selected a data processor element which is connected to the X-directional bus coupled with one of the two data processor elements and which is connected to the Y-directional bus linked to the other one thereof. The input/output change-over means included in the pertinent data processor element is supervised to establish a conductive path from the X-directional bus to the Y-directional bus via two sets of external terminal groups of the pertinent data processor, thereby achieving the data transfer between the elements. With this provision, in a system including data processor elements disposed in a matrix, when data is to be transferred between arbitrary data processor elements, the number of data processor elements which relay the transfer data is at most one regardless of the number of data processor elements constituting the system, thereby improving the data transfer speed and data processing efficiency.

Each of the data processor elements is connected to two mutually intersecting bidirectional buses in a two-dimensional structure and to three similar bidirectional buses in a three-dimensional structure. In either case, data can be transferred between arbitrary processor elements. This feature implies that each data processor element is suitably fabricated in a one-chip monolithic semiconductor integrated circuit of which the number of external input and output terminals is generally limited.

BRIEF DESCRIPTION OF THE DRAWINGS

FIG. 5A is a diagram for explaining an address control in each computer element in a case where the computer elements of the parallel computer are assigned with mutually different memory addresses of a memory space thereof;

FIG. 5B is a diagram useful to explain an example of an address translation buffer having a function to establish correspondences between the memory addresses and the computer elements;

DESCRIPTION OF THE PREFERRED EMBODIMENTS

Figure 1:
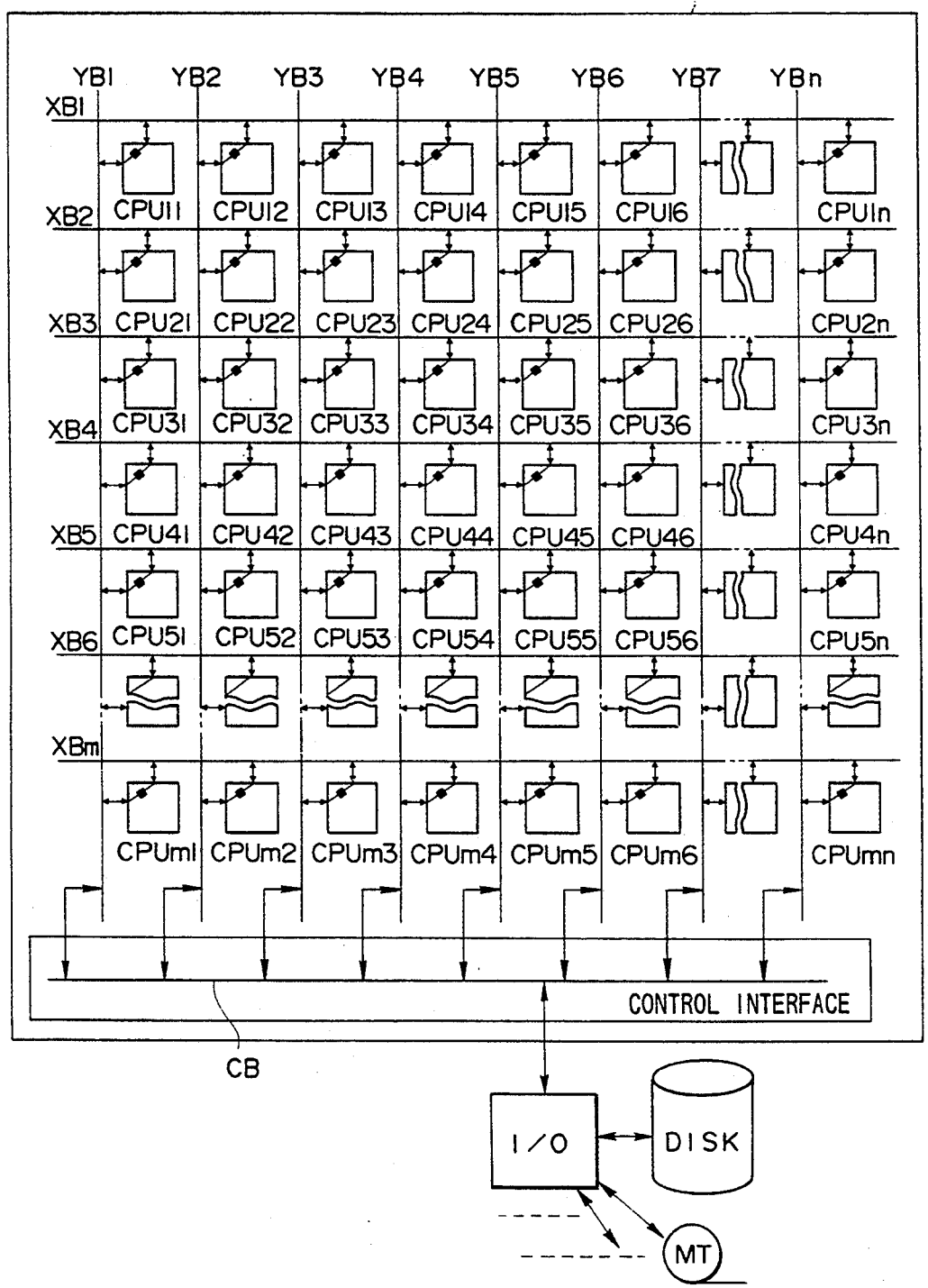
FIG. 1 is a block diagram schematically showing the overall configuration of a parallel computer in an embodiment according to the present invention.

FIG. 1 shows in a block diagram a parallel computer in an embodiment of a parallel data processor according to the present invention. In this diagram, XB1 to XBm respectively indicate 64-bit bidirectional buses disposed in an X direction on a circuit board, whereas YB1 to YBn respectively denote 64-bit bidirectional buses disposed in a Y direction thereon. The configuration includes computer elements CPUij (i=1 to m and j=1 to n) each being disposed in the proximity of an associated one of the intersections between the bidirectional X and Y buses. Namely, each computer element is connected to one of the X buses and one of the Y buses. The computer element will be abbreviated as a CPU herebelow. The bidirectional X buses XB1 to XBm and the bidirectional Y buses YB1 to YBn are used for communications between the CPU's (to transfer necessary information such as data, addresses, and control signals). For communications between CPU's, there are used, for example, data to be processed, a memory address designating a location where the data is to be stored, an instruction to indicate a method of processing the data, a memory address denoting a storage location of the instruction, and an access control signal necessary for information communications with a partner CPU. Moreover, the buses YB1 to YBn are commonly connected to a common bidirectional bus CB so as to be linked with an input/output controller (I/O), which is connected to storages such as a magnetic tape device (MT), a magnetic disk device (DISK) as well as other devices such as a keyboard and a cathode ray tube (CRT) display (not shown). The common bus CB may be connected to a semiconductor memory of a large capacity constituted, for example, of a dynamic random access memory (RAM), not shown.

In FIG. 1, a data transfer between two arbitrary CPU's (for example, CPU31 and CPU3n) commonly by connected by either one of the bidirectional buses in the X or Y directions, is achieved via the single bidirectional bus shared between these CPU's (for example, via the bus XB3). On the other hand, for a data transfer between two CPU's not commonly connected to such a bidirectional bus (for example, between CPU1nand CPUm1), there is selected a CPU (for example, CPU11) which is connected to the bidirectional bus XB1 linked to the CPU1n, namely, the request source CPU and which is connected to the bidirectional bus YB1 coupled with the CPUm1, namely, the request destination CPU. Using the CPU11 as a relay route for a connection between the buses XB1 and YB1, there is established a data path therebetween.

Figure 2:
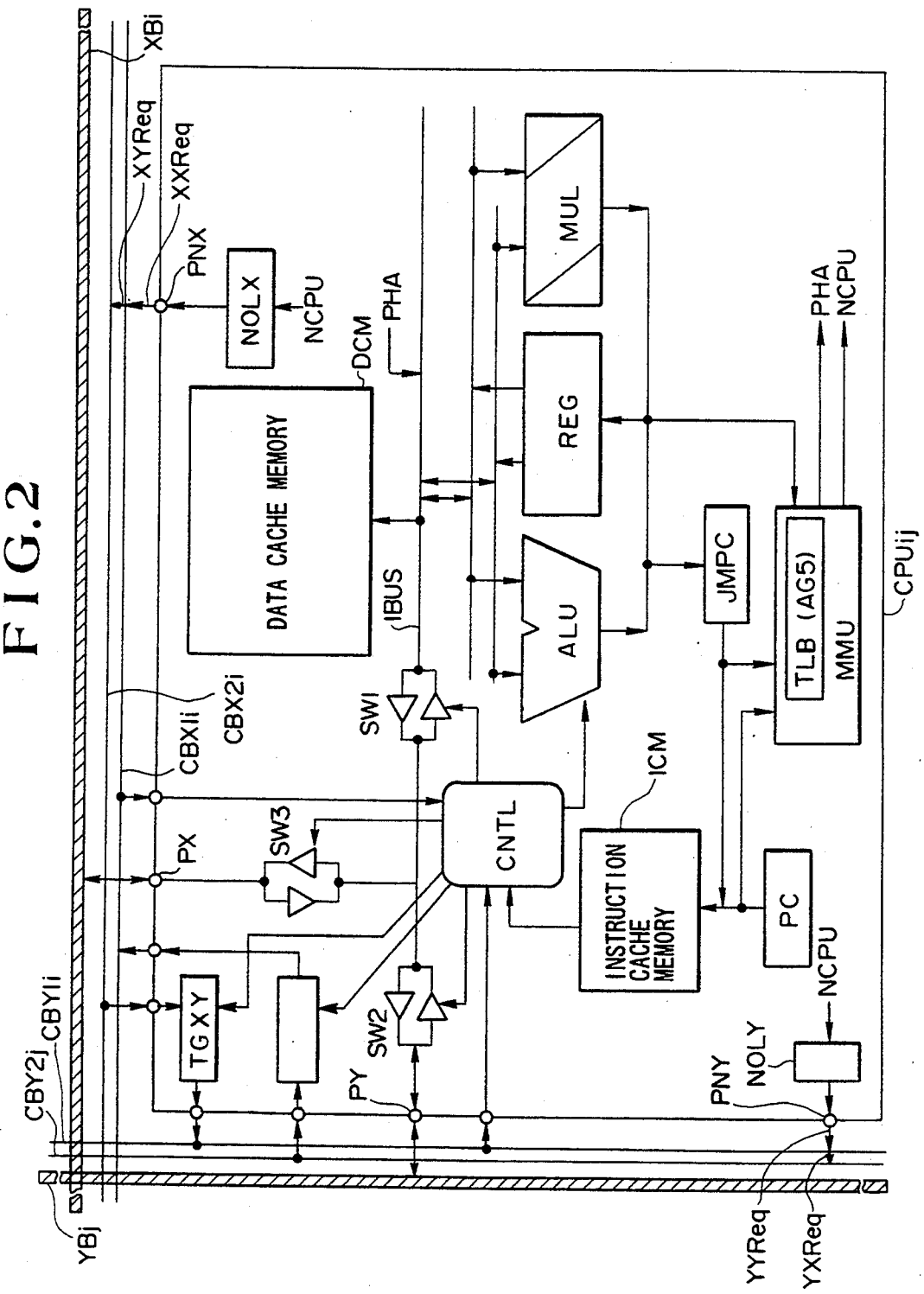
FIG. 2 is a schematic block diagram showing an example of a computer element of the parallel computer of FIG. 1.

FIG. 2 is a block diagram showing a constitution example of the CPUij of FIG. 1. In the structure, PX indicates a first group of 64-bit external terminals to be coupled with the bidirectional bus XBi and PY denotes a second group of 64-bit external terminals to be linked to the bidirectional bus YBj. The group PX is bitwise coupled with an end of an input/output buffer SW3 of a tri-state type and the group PY is bitwise linked to an end of an input/output buffer SW2 of the same type. The other ends respectively of the buffers SW2 and SW3 are commonly connected to each other for the corresponding bits respectively thereof so as to be further linked via an input/output buffer SW1 to an internal bus IBUS. In this regard, as for each of the buffers SW1, SW2, and SW3, although the constitution of FIG. 2 includes only one unit, there are actually disposed 64 units for each thereof according to the number of bits to be transferred at a time.

The computer element CPUij is configured, although not limited to, as a so-called microprocessor. In the diagram, ALU indicates an arithmetic logic unit for conducting logical and arithmetic operations on data and addresses, MUL denotes a multiplier, and REG stands for a register for temporarily storing therein intermediate results of operation and the like. These constituent components form an example of operating means to achieve operations according to an instruction. There is also arranged a data cache memory DCM as a store means for keeping therein data to be used by the operating means, thereby enabling data to be read therefrom and to be written therein. Data input/output terminals of the data cache memory DCM and the respective circuit blocks constituting the operating means share the internal bus IBUS so as to communicate data therebetween. An instruction cache memory ICM keeps therein instructions to be executed by the computer element CPUij. Although there is not shown a write path through which an instruction is written in the instruction cache memory ICM, the instruction is supplied via the internal bus IBUS thereto. The memory address of an instruction to be executed is indicated by a program counter PC, whereas for an instruction associated with a branch or jump control changing the execution sequence of the instruction, a branch destination of the instruction is indicated by a branch control circuit JMPC. The instruction read from the instruction cache memory ICM is decoded by a control circuit CNTL. Depending on a result of the decoding operation, control signals are delivered to the constituent units of the microprocessor.

The element CPUij supports, although is not limited to, a virtual memory. In the diagram, MMU stands for an address control mechanism including an address conversion or translation buffer TLB. The address control mechanism MMU achieves a control operation for an address space management in which, for example, a logical address on a virtual memory space represented by a logical address in the architecture is translated into a physical address. The address management mechanism MMU is supplied, when necessary, with an address outputted from the program counter PC, an address delivered from the jump controller JMPC, or an address resultant from an operation achieved by the operating section, thereby generating an associated physical address PHA or an information item NCPU specifying a computer element, which will be described later. When an access to the data cache memory DCM or the instruction cache memory ICM results in a cache miss or when information kept in an external device or another computer element is required, a physical address converted by the memory control mechanism MMU is used to execute an external access. The physical address PHA is outputted via the internal bus IBUS and the external terminal group PX or PY to the pertinent external unit.

Ordinarily, the element CPUij accomplishes an operation in a closed loop therein at a high speed, for example, an operation on data in the data cache memory DCM by the arithmetic logic unit ALU, the register REG, and the multiplier MUL according to instructions kept in the instruction cache memory ICM so as to write again a result of the operation in the data cache memory DCM. However, in a case where information possessed by another computer element is required or where an access to the instruction cache memory ICM results in a cache miss, it is necessary to transfer data and instructions to the pertinent computer element via the input/output buffers SW1, SW2, and SW3 and the control circuit CNTL.

Subsequently, description will be given in detail of communications of data between the computer elements.

In the structure of FIG. 2, the information item NCPU specifying a computer element is fed to output logic circuits NOLX and NOLY. The circuit NOLX outputs, according to the item NCPU, an information item XXReq of an X-directional position of a computer element to be specified as a destination of the connection and an information item XXReq of a Y-directional position of the destination computer element from the output terminal group PNX. The circuit NOLY outputs, according to the item NCPU, an information item YYReq of a Y-directional position of a computer element to be specified as a destination of the connection and an information item YXReq of an X-directional position of the destination computer element from the output terminal group PNY. The output operations respectively of the output logic circuits NOLX and NOLY are selectively executed. As a result, there is achieved an exclusive control for the transfer path. In the diagram, CBX1$i$ and CBX2$i$ designate X control buses disposed in parallel with the bidirectional X bus XBi to propagate the positional information in the X direction; whereas, CBY1$j$ and CBY2$j$ denote Y control buses disposed in parallel with the bidirectional Y bus YBj to propagate the positional information in the X direction. The X-positional information XXReq produced from the circuit NOLX is a column number information item designating a position of a computer element arranged in an identical direction with respect to the X direction, while the Y-positional information XYReq created from the circuit NOLX is a row number information item indicating a position of a computer element arranged in the Y direction with respect to the X direction. Furthermore, the Y-positional information YYReq generated from the circuit NOLY is a row number information item designating a position of a computer element arranged in an identical direction with respect to the Y direction, whereas the X-positional information YXReq created from the circuit NOLY is a column number information item indicating a position of a computer element arranged in the X direction with respect to the Y direction. In the diagram of FIG. 2, TGXY indicates a propagation gate for selectively propagating the Y-directional position information XYReq from the X control bus CBX2$i$ to the Y-directional control bus CBY1$j$. TGYX denotes a propagation gate for selectively propagating the X-directional position information YXReq from the Y control bus CBY2$j$ to the X-directional control bus CBX1$i$.

The controller CNTL keeps a row number and a column number assigned thereto to compare its own information items with the information items of the row and column numbers propagated respectively from the control buses CBX1$i$ and CBY1$j$. On recognizing that the specification is issued thereto as a result of the comparison, the controller controls the input/output buffers SW1 and SW3 and the propagation gates TGXY and TGYX, for example, in the following control modes.

a. In a first control mode in which a computer element is employed as an information relay element from the X direction to the Y direction, the controller establishes a propagation path to transfer information from the terminal group PX via the input/output buffers SW3 and SW2 to the terminal group PY and enables XYreq to be propagated from the bus CBX2$i$ via the gate TGXY to the bus CBY1$j$.

b. In a second control mode in which a computer element is employed as an information relay element from the Y direction to the X direction, the controller establishes a propagation route to pass information from the terminal group PY to the terminal group PX and enables YXreq to be propagated from the bus CBX2$j$ via the gate TGYX to the bus CBX1$i$.

c. In a third control mode, the controller establishes a propagation path to communicate information between the bidirectional bus XBi and the internal bus IBUS via the buffers SW3 and SW1.

d. In a fourth control mode, the controller establishes a propagation route to communicate information between the bidirectional bus YBj and the internal bus IBUS via the buffers SW2 and SW1.

In the first and second control modes, the signals XXReq and YYReq each include an indication to decide whether or not a computer element is employed as a relay element. For example, when a row number acquired from the computer element number NCPU does not match its own row number, the output logic circuit NOLX produces the signal XXReq including a control bit indicating that a computer element is used as a relay element.

Figure 3:
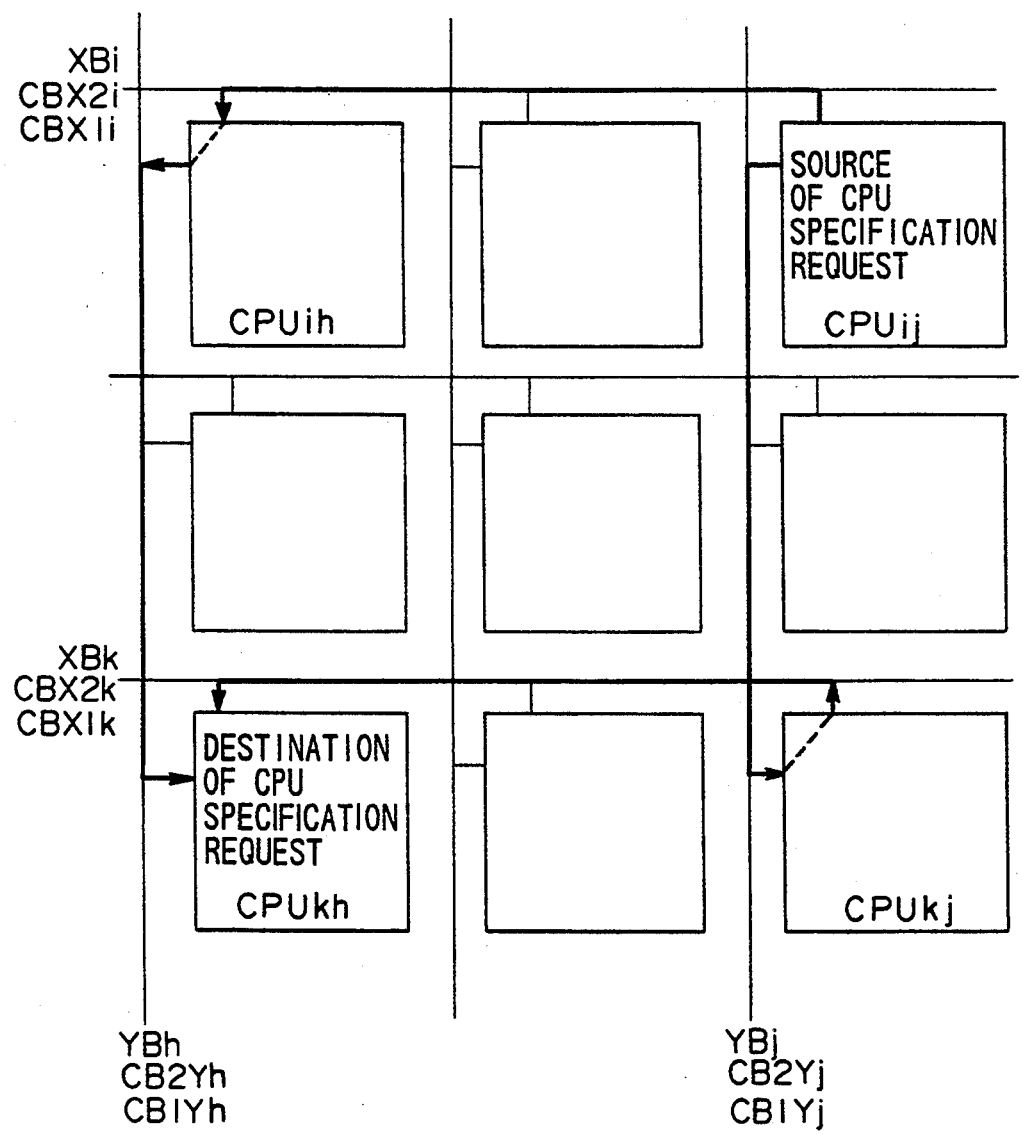
FIG. 3 is a diagram useful to conceptually explain specification modes of specifying an objective computer element.

FIG. 3 shows an example of the specification mode of the computer element according to the control modes above in which a computer element CPUij specifies another computer element to achieve an information exchange. When the element CPUij communicates information with an element CPUih on an identical row, the signal XXReq indicates the element CPUih; whereas, when the element CPUij communicates information with an element CPUkj on an identical column, the signal YYReq indicates the element CPUkj. When the element CPUij conducts an information communication with an element CPUkh, the signal XXReq designates an operation of a relay element to the element CPUih and the signal XYReq to be relayed toward the Y direction indicates the element CPUkh. In this situation, the bidirectional buses XBi and YBh are set to form an information transfer route. To establish the bidirectional buses YBj and XBk to configure an information transfer path, the signal YYReq denotes an operation of a relay element to the element CPUkj and the signal YXReq to be relayed toward the X direction indicates the element CPUkh. According to the embodiment, the transfer path from an computer element to another element existing on a row and a column which are not identical to a row and a column of the pertinent computer can be specified in either one of two directions, namely, from the X direction to the Y direction and vice versa. Consequently, there are two information transfer paths available to possibly avoid conflict between signal transfers on the bidirectional buses in the parallel or concurrent processing of the multiplicity of computer elements, thereby improving the transfer efficiency.

Figure 4:
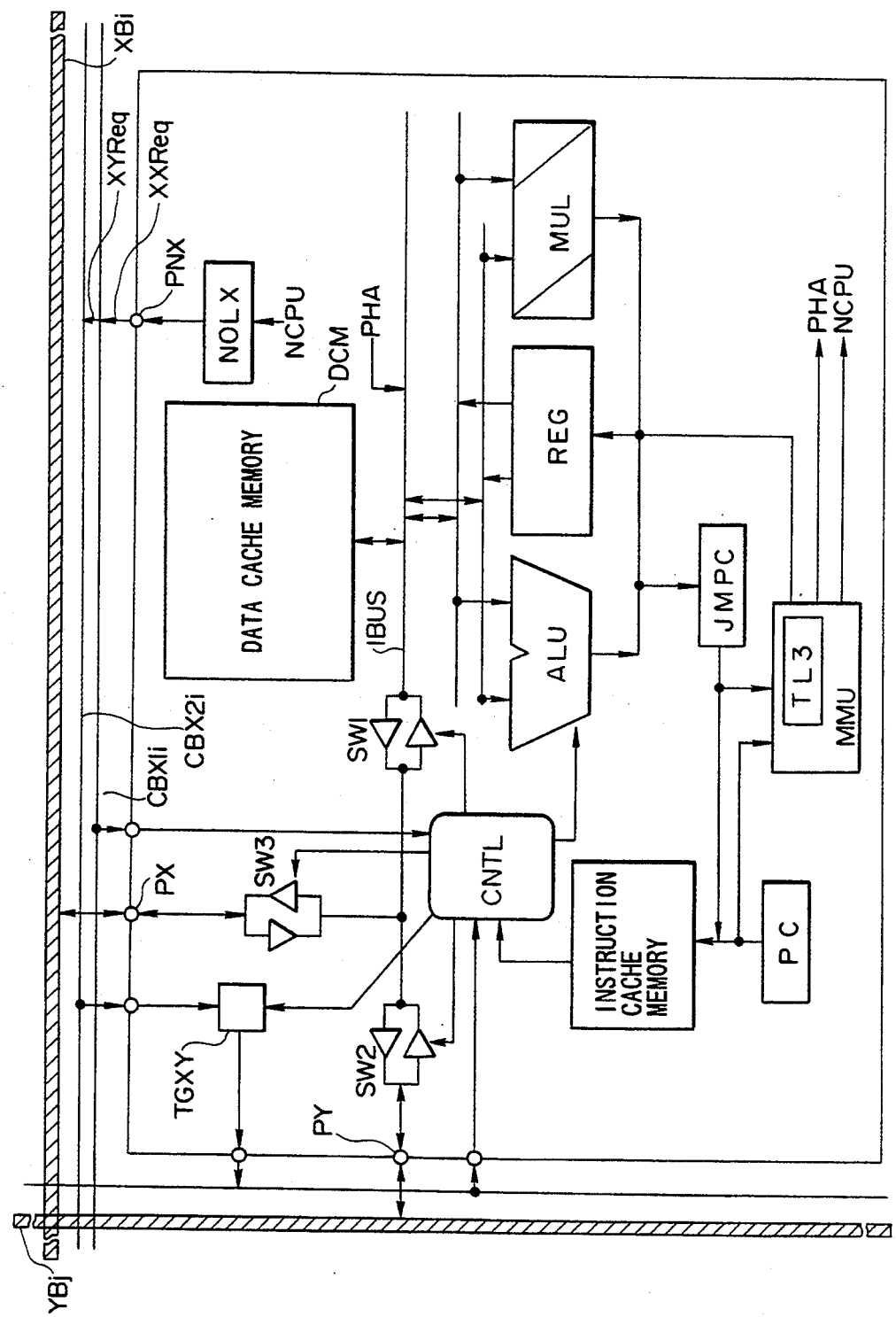
FIG. 4 is a block diagram showing an embodiment of a computer element having only one path to communicate information with another computer element which does not exist on a row and a column where the pertinent computer element is located.

FIG. 4 shows an alternative embodiment of the computer element having a single transfer path to another computer element on a row and a column which are different from those of the pertinent computer element. In this embodiment, as compared with the constitution of FIG. 2, the output logic circuit NOLY and the propagation gate TGYX are omitted and only the Y-directional control bus CBY1$i$ is disposed. The other components are the same as those of FIG. 2.

Next, description will be given of a configuration in which a computer element determines one of the other computer elements which possesses information necessary for a processing step of the pertinent computer element, namely, how to obtain the specified information from the objective computer element.

Memory addresses of the main memory in which instructions and data are to be stored are individually assigned to each computer element by the operating system (OS). For example, as shown in FIG. 5A, the memory addresses are sequentially assigned to the memory space of the overall parallel computer system. Correspondences between the memory addresses and the computer elements are stored in each computer element according to the address translation buffer TLB as follows. In general, for the memory addresses of the memory in which the instructions and data are stored, there has been commonly known a virtual memory system in which storages such as a magnetic disk are used to develop logical addresses for virtually expanding the memory space. With provisions of the logical addresses and physical addresses actually associated with the memory, there is realized an effective memory use. To introduce the virtual memory system into practical applications, it is necessary to employ an address translation table to translate or convert a logical address into a physical address. Entries of the table which have a high access frequency are transferred to the address translation buffer TLB to be kept therein. FIG. 5B shows an example of the constitution of the buffer TLB. The buffer TLB is actually constituted of a random access memory (RAM). When a logical address is supplied as an address of the RAM, a physical address associated therewith is read from the buffer TLB. In this case, the contents of the RAM contain, in addition to the physical address, information specifying a computer element in which data of the memory address is-stored, namely, a (CPU) number thereof. As a result, there is attained a memory address corresponding to the logical address and the element specification information paired therewith. When an entry associated with the logical address is missing in the buffer TLB, the address translation table formed in an external memory such as a magnetic disk storage is accessed so as to read therefrom a desired entry and entries in the proximity thereof, thereby updating the contents of the buffer TLB with the obtained entries.

Figure 6:
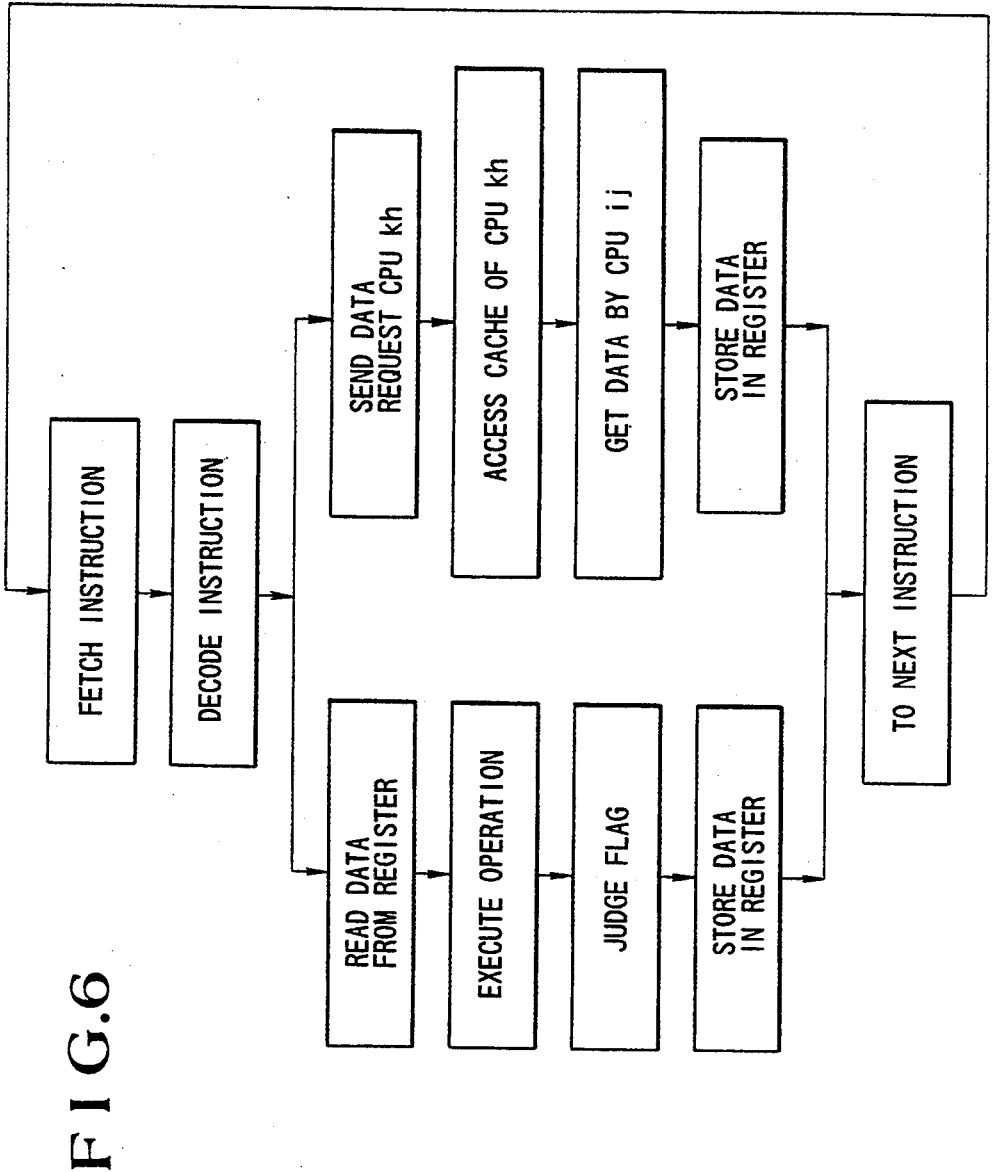
FIG. 6 is a flowchart showing an example of data processing of the computer element.
Figure 7:
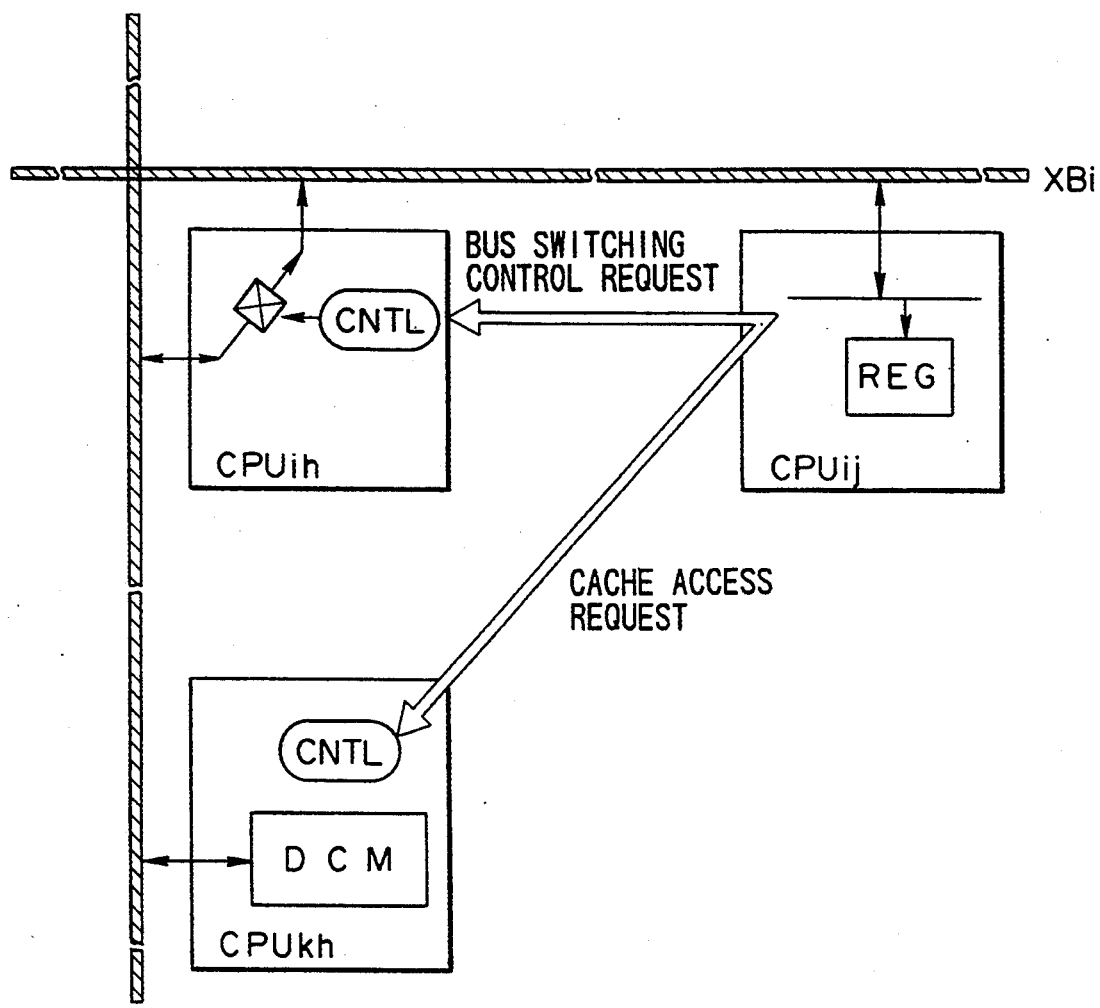
FIG. 7 is a diagram for explaining an example of specification issued from a computer element to acquire data from another computer element.

FIG. 6 shows an example of the data processing flowchart of the computer element. An instruction is fetched from the instruction cache memory (ICM) according to a memory address indicated by the program counter PC (instruction fetch step) and then is decoded by the controller (CNTL) to determine the contents of processing (instruction decoding step). In a case where the instruction is executed depending only on internal information of the pertinent computer element CPUij, the processing is continuously accomplished according to the processing flow shown on the left side of FIG. 6. When data possessed by any other computer element is necessary, the processing is achieved, for example, according to the processing flow shown on the right side of FIG. 6. In the example of the flowchart on the left side of FIG.6, data kept in the register REG (refer to, for example, FIG. 1) is read therefrom to be subjected to an operation by the arithmetic logic unit ALU and then a check is made for a flag such that a result of the operation is stored in the register REG, thereby executing the instruction within the element CPUij. According to the flowchart on the left side of FIG. 6, there is executed an instruction in which data of the other computer element is written in the register REG. In this example, information denoting a computer element having data of a memory address to be externally obtained is beforehand stored in the address translation buffer TLB. Referencing the data according to a logical address thereof, it can be recognized that the data exists, for example, in the element CPUkh. For this purpose, as shown in FIG. 7, a data request signal (information of a position of the computer element) is transferred from the element CPUij via a control bus, not shown, to the elements CPUih and CPUkh. Resultantly, the elements CPUij and CPUkh are connected to each other via the X bus XBi, the computer element CPUih, and the Y bus YBh. The element CPUij supplies an address signal to the memory DCM integrated in the element CPUkh to indicate a read operation thereto. Data is in turn read from the memory DCM and is then outputted onto the Y bus YBh. Subsequently, as can be seen from FIG. 8, data acquired from the memory DCM of the element CPUkh is transferred via the bus YBh and the element CPUih to the bus XBi. The data is acquired by the element CPUij to be stored in the register REG.

Figure 8:
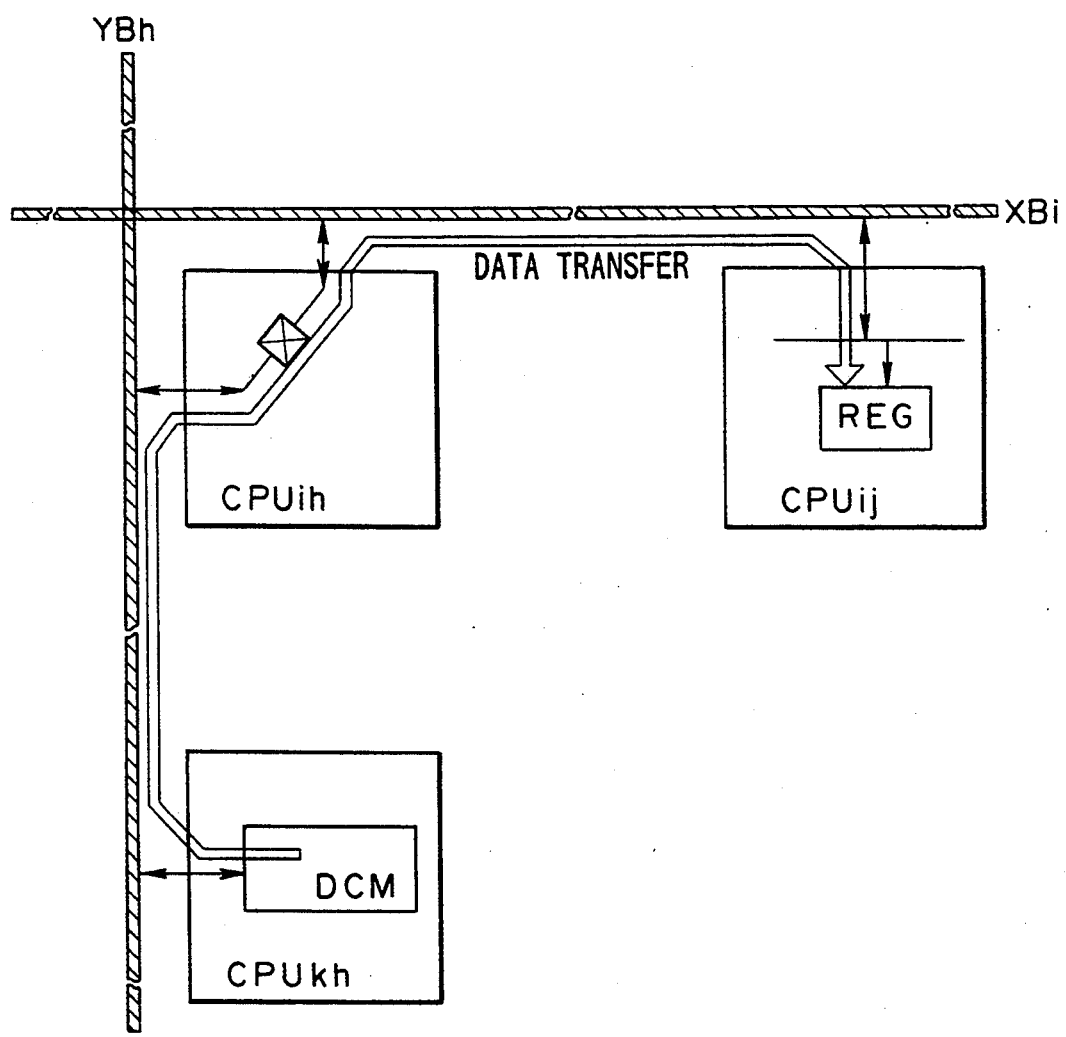
FIG. 8 is a diagram to explain an example of data transfer initiated by a computer element to obtain data from another computer element.
Figure 9:
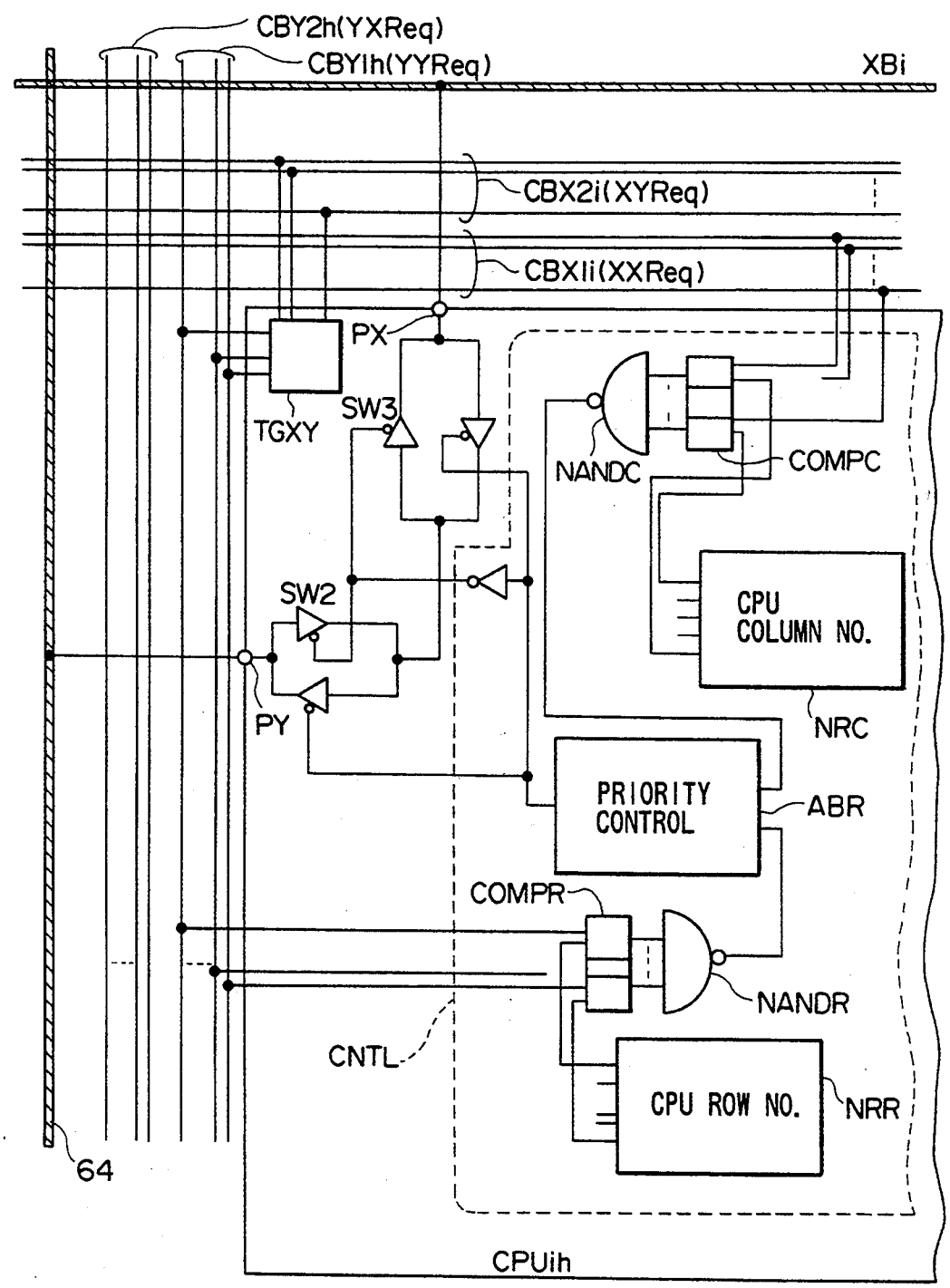
FIG. 9 is a diagram for specifically explaining the examples of communications between the computer elements shown in FIGS. 7 and 8, respectively.

FIG. 9 shows a portion of the computer element CPUih of FIGS. 7 and 8. Referring to the circuit constitution of FIG. 9, description will now be given in more detail of the operation of FIGS. 7 and 8. For example, when data of the other computer element is to be written in the register REG of the pertinent computer, since information designating correspondences between data of memory addresses and computer elements having the data is beforehand stored the address translation buffer TLB, the system references the contents of the buffer TLB according to a logical address like an operand address of an instruction. As a result, it can be found from the specification information NCPU that the necessary data exists, for example, in the element CPUkh. For example, the information NCPU is assumed to indicate a computer element at a position represented by a row number k and a column number h. In response to the information NCPU, the element CPUij supplies the control buses CBX1$i$ and CBX2$i$ respectively with a signal XXReq including a bit series denoting the column number "h" and a control mode indicating a relay mode and a signal XYReq containing a bit series designating the row number "k". On the other hand, in the control circuit CNTL of the element CPUih, there is disposed a CPU column number register NRC. When the system is powered, "h" is set to the register NRC. The controller CNTL of the element CPUih compares the column number with that of the signal XXReq by a comparator circuit COMPC. When a matching condition is recognized for all bits by a NAND gate NANDC, the controller CNTL controls operations of the input buffers SW2 and SW3 functioning as TTL buffers to transfer data from the bus XBi to the bus YBh, thereby establishing a connection between the external terminal groups PX and PY. In this situation, the value of the memory address of the data storage location and the access control signal have already been fed from the element CPUij to the bus XBi such that the memory address and the like are transferred via the element CPUih to the bus YBh. Moreover, the signal XYReq indicating the row number "k" is propagated via the propagation gate TGXY to the control bus CBYlh under control of the controller CNTL. On the other hand, in a CPU row number register NRR disposed in the controller CNTL of the element CPUkh, there is loaded a row number "k" when the system is powered. The element CPUkh compares the CPU row number kept in the register NRR with that of the signal YYReq by a comparator circuit COMPR. When a matching condition is detected for all bits by an NAND gate NANDR, the element CPUkh recognizes a reception of an access request and then acquires the memory address and information related thereto from the bus YBh. In the element CPUkh, an access is effected to the memory DCM such that data thus obtained is delivered to the bus YBh. In the element CPUih, in association with the access timing to the memory DCM in the element CPUkh or at a timing mutually synchronized with a predetermined timing, the input and output directions of the input/output buffers SW2 and SW3 are reversed. Thereafter, the operation state is controlled to transfer data from the bus YBh to the bus XBi so as to establish a connection from the bus YBh to the XBi. As a result, as shown in FIG. 8, data attained from the memory DCM of the element CPUkh is transferred from the bus YBh via the element CPUih to the bus XBi. The data is acquired by the element CPUij to be stored in the register REG. In this regard, ABR of FIG. 9 indicates a priority control circuit for achieving a priority control to avoid conflict between a specification from the X-directional control bus CBX1$i$ to the element CPUih and a specification from the Y-directional control bus CBY1$h$ to the element CPUih.

Figure 10:
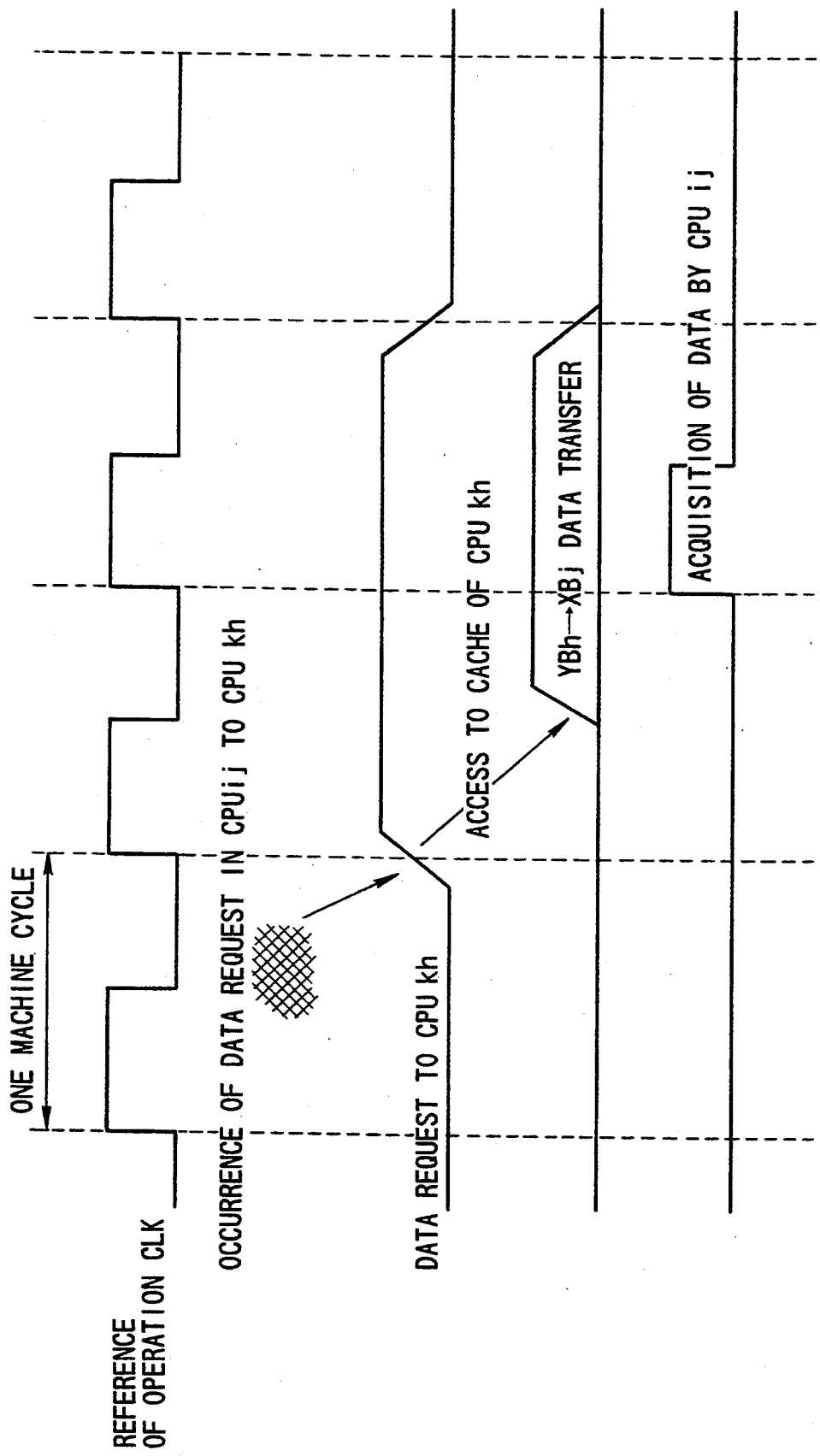
FIG. 10 is a signal timing chart showing an example of communication between computer elements to be operated to store data from the source computer element in an register of the destination computer element.

FIG. 10 shows a signal timing chart of an example of the communication has been described in conjunction with FIG. 9 in which an element communicates data with a destination element to write data attained from the destination element in the integrated register REG of the pertinent element. Processing "data request REG of the pertinent element. Processing "data request to CPUkh" of FIG. 6 corresponds to the first cycle of FIG. 10. In the first-half portion of the first cycle, the buffer TLB is referenced to determine that the desired data is stored therein. According to this embodiment, one machine cycle has, for example, a period of time of ten nanoseconds (ns). In the last-half portion thereof, the row number "k" the column number "h" and the memory address and the like are outputted from the element CPUij as the signal XYReq, as the signal XXReq, and onto the bus XBi, respectively. As a result, the period of time for the buffers SW2 and SW3 as TTL buffers to drive the bidirectional bus YBh is set to, for example, about two nanoseconds such that the element CPUkh receives, at the beginning of the second cycle, the memory address and the like to start accessing the memory DCM. The period of time necessary to access the memory DCM is, for example, five nanoseconds. In the last-half portion of the cycle, data obtained from the memory DCM can be outputted to the bus YBh. Consequently, at the beginning of the third cycle, the element CPUij can acquire the data. Namely, when only 1.5 machine cycles are elapsed after the issuance of the data request, the data can be acquired. In this description, letters h, i, j, and k stand for arbitrary numbers. As shown in FIG. 10, even if the elements CPUij and CPUkh are considerably apart from each other, the element CPUij can obtain the data from the element CPUkh basically only after 1.5 machine cycles from the occurrence of the data request, thereby executing the subsequent processing with the attained data.

For example, in a conventionally known case of computer elements arranged in the two-dimensional grid connection, when data is transferred from an element CPU11 to an element CPU89, the data is required to be transferred via 15 CPU's. Consequently, at least 15 machine cycles are required for the data transfer. According to the embodiment of the present invention, the data can be transferred in only 1.5 machine cycles also in this case, thereby developing a transfer speed about ten times that of the conventional example. In general, data are comparatively localized in the system. When a great amount of data is desired to be processed at a high speed according to the prior art, the limited period of time required to transfer data and the like between the computer elements becomes a bottleneck and hence the performance of the overall system is remarkably deteriorated. According to the present invention as described above, when the number of concurrent operations is set as 30 by 30 in the system, it can be expected that depending on the use thereof, the transfer speed can be at most increased to be about 10 to 20 times that of the conventional system.

Figure 11:
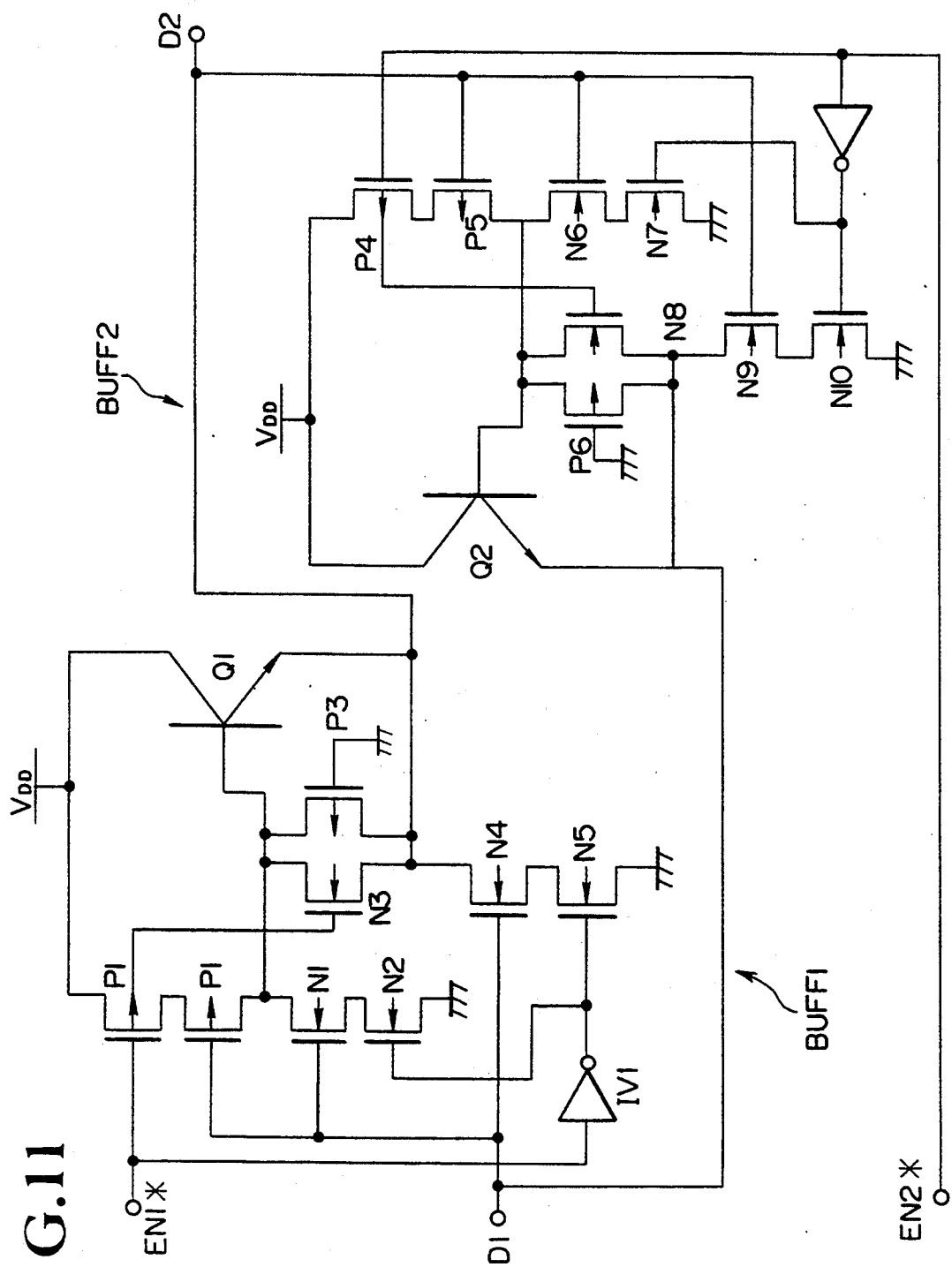
FIG. 11 is a diagram showing an example of the one-bit circuit configuration of an input/output buffer functioning as a transistor transistor logic (TTL) buffer.

FIG. 11 shows an example of a circuit configuration for one bit of the input output buffer functioning as a component of the TTL buffer. Although not particularly limited to, the system of FIG. 11 is formed in a BiCMOS circuit structure and includes two tri-state BiCOS buffers BUFF1 and BUFF2, which are connected in a reverse direction with respect to terminals D1 and D2 respectively thereof. In the diagram, EN1* and EN2* denote enable signals respectively of the CMOS buffers. When these signals are set to an "L". (low) level, the associated buffers are set to an output enable state; whereas when these signals are set to an "H" (high) level, the associated buffers are set to a high impedance state. The buffer BUFF1 includes, for example as shown in FIG. 11, MOS transistors of a p-type channel P1, P2, and P3; MOS transistors of an n-type channel N1 to N5, a bipolar transistor of an n-p-n type Q1, and an inverter IV1. Similarly, the buffer BUFF2 is constituted with MOS transistors of a p-type channel P4, P5, and P6; MOS transistors of an n-type channel N6 to N10, a bipolar transistor of an n-p-n type Q2, and an inverter IV2.

Figure 12:
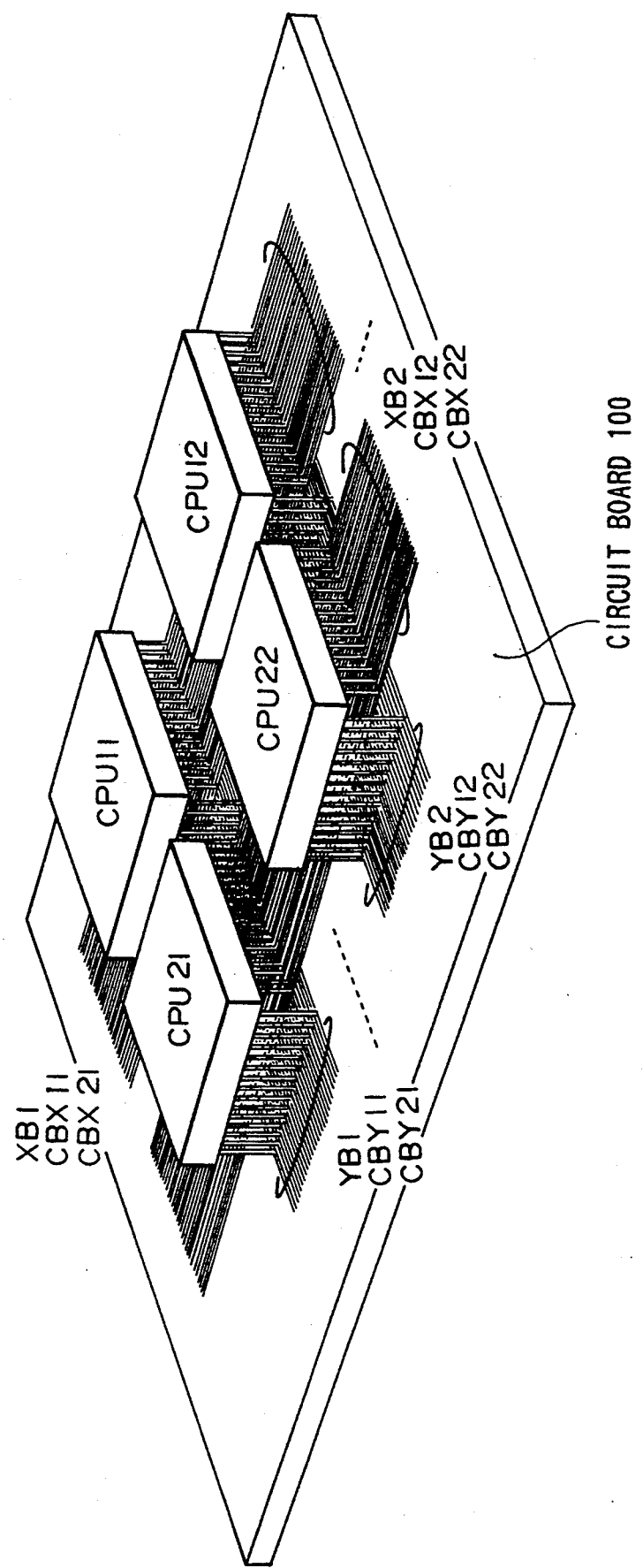
FIG. 12 is a perspective view showing a portion of a circuit board on which computer elements are mounted in the parallel computer of FIG. 1.

FIG. 12 shows in a perspective view a portion of a circuit board 100 on which the computer elements are mounted in the parallel computer of FIG. 1. In this diagram, there have been representatively shown four computer elements CPU11, CPU12, CPU21, and CPU22. Each of these elements is formed in the structure above on a semiconductor substrate made of a material, e.g., silicon according to the known technologies of manufacturing semiconductor integrated circuits such as BiCMOS. The element is packaged, for example, in the form of a pin grid array (PGA) to be mounted on the circuit board 100. The board 100 is a multilayer substrate constituted with a grass epoxy resin, an alumina, etc. The bidirectional buses XB1, XB2, YB1, and YB2 and the control buses CBX11, CBX21, CBX12, CBX22, CBY11, CBY21, CBY12, and CBY22 are representatively formed as wiring patterns respectively in the X and Y directions with mutually different signal layers on the circuit board 100. For example, the buses XB1 and XB2 are disposed in the first signal layer; whereas, the buses YB1 and YB2 are fabricated in the second signal layer. On an identical row, the buses XBi elongated in the X direction are commonly connected to predetermined external connection pins of j computer elements CPUij (j=1 to n). Moreover, on an identical column, the buses YBj disposed in the Y direction are commonly connected to predetermined external connection pins of i computer elements CPUij (j=1 to m). According to the embodiment, the buses XBi and YBj operate at a signal level substantially equal to the standard TTL level and are driven by a TTL compatible buffer in the element CPUij. The X and Y buses to which the respective elements CPUij are connected are of 64-bit buses in this embodiment. This hence facilitates fabrication of a PGA package in which the number of external connection pins are about 200 to about 400. Namely, the circuit system can be easily manufactured in the form of a one-chip device. In general, in a CPU fabricated according to the fine manufacturing technology developed as a result of innovation in the semiconductor production, operations can be achieved at an ultra high speed. However, wirings to be externally disposed on the CPU hinder such a high speed operation because the time constant due to the parasitic capacitance and the like of the wirings depends on the physical size of the CPU. In this connection, as can be understood from the description of the embodiment of the present invention, the number of signal-propagations between the chips as the computer elements can be reduced to the possible extent. Furthermore, when the bidirectional buses XBi and YBj as the external buses are linearly disposed to possibly minimize the total wiring lengths respectively thereof, the physical size of the parallel computer system can be decreased. In addition, since communications of data and the like between any computer elements can be achieved via at most two bidiretional buses, each of the computer elements is quite suitably fabricated in a one-chip semiconductor integrated circuit having the limited number of pins.

Figure 13:
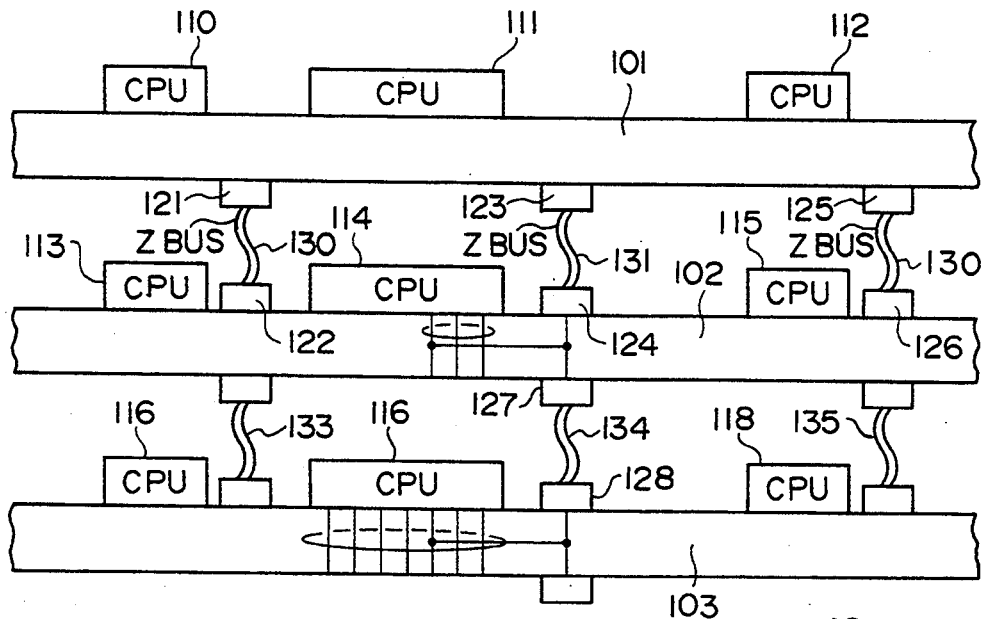
FIG. 13 is a cross-sectional view showing an embodiment of the Z-directional connection configuration, namely, a stacked structure in a case where the two-dimensional arrangements of FIGS. 1 and 12 are developed to a three-dimensional constitution.
Figure 14:
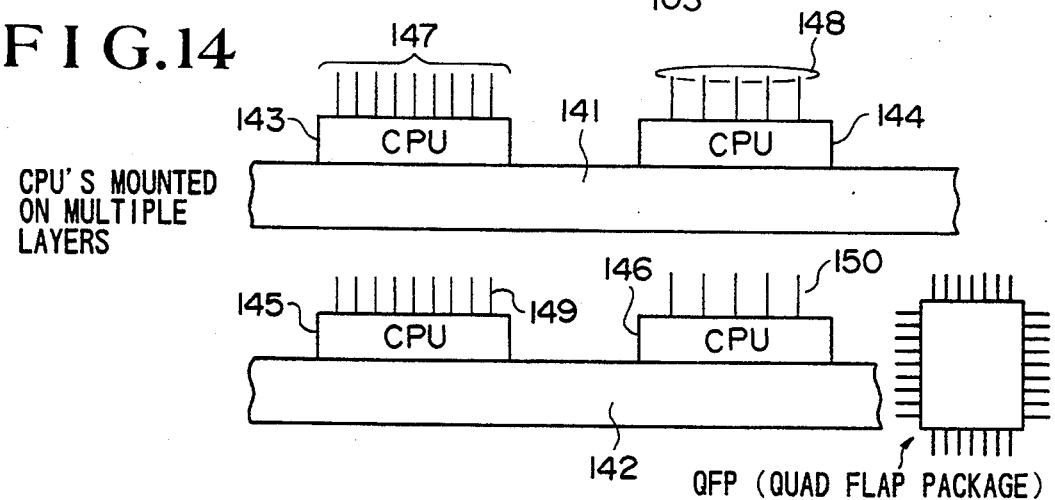
FIG. 14 is a cross-sectional view showing an embodiment in which the stacked structure of FIG. 13 is formed in multiple layers.
Figure 15:
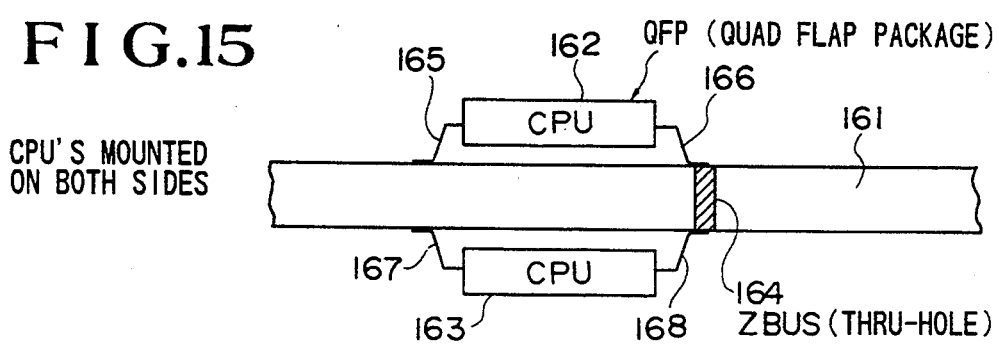
FIG. 15 is a partial cross-sectional view showing an embodiment of a parallel computer in which CPUs are arranged on both sides of a circuit board in a matrix in a three-dimensional structure.

Referring now to FIGS. 13 to 15, description will be given of the configuration examples of parallel computers in which computer elements CPU's are arranged in a three-dimensional fashion to be each connected to bidirectional buses disposed respectively in the X, Y, and Z directions, thereby arbitrarily transferring data between the computer elements. This structure can be considered as a development of the two-dimensional configuration example of FIG. 12.

FIG. 13 shows in a cross-sectional view an example of the parallel computer including computer elements disposed in a three-dimensional array. In this diagram, reference numerals 101 to 103 respectively denote circuit boards similar to the circuit board 100. Computer elements 113 to 115 and 116 to 118 are respectively arranged in a matrix array to be mounted respectively in the form of PGA packages on the associated circuit boards. Reference numerals 121 to 129 denote connectors formed on the related circuit boards. The connectors of the respective circuits boards are connected to each other by bus conductors such as cables constituting buses in the Z direction. In each of the circuit boards, like in the case of FIG. 12, the X-directional and Y-directional wirings are formed in a pattern such that selected pins respectively of pin grid arrays 136 and 138 from the package of the corresponding computer element are connected to the wiring pattern and further to the Z-directional buses, for example, via conductors 134 and 137. These circuit boards on which the plural computer elements CPU's are mounted are configured in the form of a stack structure by use of coupling means such as an adhesive agent and a clamping member. It is to be understood by those skilled in the art that in each CPU, there may be additionally disposed gate circuits TGXZ, TGZX, TGYZ, and TGZY; an input/output buffer circuit SW4, and a logical output circuit NOLZ (not shown) for generating information of a Z-directional position associated with the specification information NCPU such that these gate circuits and the input/output buffer circuit are controlled together with the gate circuits TGXY and TGYX and the buffer circuits SW2 and SW3 by the control circuit CNTL.

FIG. 14 is a cross-sectional view showing a three-dimensional configuration example in which a plurality of circuit boards 141 and 142 including computer elements mounted respectively thereon in matrix arrays are fabricated in a multilayer structure. On the substrates of the respective layers, there are disposed CPU's 143 and 144 and CPU's 145 and 146, respectively. These PGA packages of 143 to 146 have signal pins 147 to 150 respectively at their top surfaces and are also connected to a bus wiring pattern 151 disposed on the substrate.

FIG. 15 is a cross-sectional view showing a portion of a semiconductor device in an alternative embodiment in which CPU's are arranged in a three-dimensional manner. In FIG. 15, on both sides of a circuit board 161, there are disposed CPU's 162 and 163 in a matrix. Each CPU is contained in a quad flap package (QFP) having external terminals 165 to 168. The terminal 166 is connected to the terminal 168 via a thru-holes 164 disposed in the substrate 161. The thru-holes are used to form bidirectional Z buses. On each side of the substrate, X and Y buses are manufactured substantially in the form of a matrix. At each physical intersection defined by the X buses, Y buses, and Z buses thus formed by the thru-holes, there is arranged a computer element CPU. The CPU is connected to these buses under control of a control unit CNTL thereof so that the CPU can selectively transfer data via one of the X, Y, and Z buses or can bypass (relay) data therefrom to another bus.

According to the embodiment, there are obtained the following advantageous features, for example.

(1) In a case of communication of information between arbitrary computer elements, regardless of the number of the computer elements arranged in the matrix, the number of the data processor elements to relay the transfer information is at most one in association with an intersection between the X and Y buses related to the communicating elements. This increases the information transfer speed between the computer elements and leads to improvement of the data processing efficiency.

(2) Thanks to the feature (1) above, the number of signal propagations between the chips, i.e., computer elements as well as the total wiring length is possibly reduced by linearly arranging the bidirectional buses as external buses in an effective fashion, which also contributes to minimization of the physical size of the entire parallel computer system.

(3) When arranged in a two-dimensional matrix, each of the respective computer elements is connected to the two bidirectional buses. This enables the computer element to communicate information with an arbitrary one of the other computer elements in any situation. Consequently, the computer element is suitably configured as a one-chip monolithic semiconductor integrated circuit of which the number of input and output terminals are limited in general.

(4) A computer element CPU can specify any one of the other computer elements not existing on a row and a column of the pertinent computer in either one of two directions. Namely, for example, when the CPU's are arranged in a two-dimensional array, the objective CPU may be specified from the X direction to the Y direction or vice versa. As a consequence, either one of two paths is available for transferring information. In the concurrent processing of the plural CPU's, it is possible to avoid conflict between transfer requests on the bidirectional buses to the maximum extent, thereby improving the transfer efficiency.

The invention of the present inventors has been specifically described according to the embodiments, which however do not restrict the present invention. It is to be understood by those skilled in the art that the embodiments can be changed or modified without departing from the scope and spirit of the present invention.

The method of specifying a computer element as a communication partner is not restricted by the embodiments but various changes and modifications thereof can be made in an appropriate manner. For example, the control operation of the specification may be achieved by the operating system.

In this specification, the invention of the present inventors has been described primarily in conjunction with a case of the utilization field thereof where the invention is applied to a parallel computer including computer elements each having an integrated data cache memory. However, it is to be understood that the invention is broadly applicable to various kinds of parallel computers.

What is claimed is:

1. A parallel data processing apparatus comprising:
   a plurality of data processing elements arranged in a plurality of rows and columns in a matrix pattern; and
   a plurality of bidirectional X buses and a plurality of bidirectional Y buses arranged in a matrix array which interconnects the data processing elements with each other, each of the plurality of data processing elements disposed in a common row being connected to a common one of the X buses and each of the plurality data processing elements disposed in a common column being connected to a common one of the Y buses; and,
   each of said plurality of data processing elements including:
      generating means for generating specification information including an information item representing an X-directional position and a Y-directional position of another data processor element to be specified for data transfer;
      operating means for performing operations according to an instruction;
      store means for holding
      therein information to be used by the operating means, the information being read therefrom and being written therein;
      a transfer path for selectively transferring information between one of said X buses and one of said Y buses and between the X and Y buses and said operating means and said store means;
      a plurality of sets of external terminal groups for inputting and outputting the information to or from said X and Y buses, a first external terminal group of each of the plurality of data processing elements being coupled with one of the bidirectional X-buses and a second external terminal group of the each data processing element being connected to one of the bidirectional Y buses;
      input/output change-over means for selectively connecting the first and second external terminal groups to said transfer path; and,
      control means for controlling a connection mode of the input/output change-over means based on the specification information received from said generating means.

2. An apparatus according to claim 1, further including X control buses disposed respectively corresponding to the bidirectional X buses and Y control buses arranged respectively corresponding to the bidirectional Y buses, wherein:
   each of the plurality of data processor elements further includes:
   specification information output means for outputting the specification information thus generated to the X control bus; and
   an XY propagating means for selectively propagating to the Y control bus the information item of the Y-directional position supplied from the X control bus,
   wherein the control means has a control mode in which the control means controls, when the information item of the X-directional position supplied from the X control bus coincides with an X-directional position assigned thereto, the XY propagating means to output the information item of the Y-directional position to the Y control bus and controls the input/output change-over means to propagate the information from the bidirectional X bus to the bidirectional Y bus.

3. An apparatus according to claim 2, wherein each of the plurality of data processor elements further includes:
   specification information output means for outputting the specification information thus generated from said generating means to the Y control bus; and
   a YX propagating means for selectively propagating to the X control bus the information item of the X-directional position supplied from the Y control bus, and
   the control means has a control mode in which the control means controls, when the information item of the Y-directional position supplied from the Y control bus coincides with a Y-directional position assigned thereto, the YX propagating means to output the information item of the X-directional position to the X control bus and controls the input/output change-over means to propagate the information from the Y bus to the X bus.

4. An apparatus according to claim 2, wherein:
   the respective store means of the plurality of data processing elements are assigned mutually different physical addresses; and
   said generating means includes an address translation mechanism for translating a logical address into a physical address, the address translation mechanism being capable of storing therein an entry including the physical address corresponding to the logical address and information specifying one of the plurality of data processing elements having the store means associated with the physical address and being capable of outputting the specification information together with the physical address corresponding to the logical address.

5. An apparatus according to claim 1, wherein the data processor element includes a monolithic semiconductor integrated circuit.

6. A parallel information processing apparatus comprising:
   a plurality of processors arranged cubically in a matrix defined by orthogonal x, y, and z directions, a location of each processor relative to the x, y, and z directions being defined by x, y, and z directional positions; and bus means disposed substantially in a three-dimensional matrix array for communicating information between the processors, the bus means including bidirectional x, y, and z buses in a three dimension matrix and extending, respectively along the x, y, and z directions;

each of the plurality of processors including:
  generating means for generating specification information including an information item representing the x, y and z directional positions of another data processor element to be specified for data transfer;
  operating means for performing processing operations according to an instruction;
  store means for storing information for the operating means;
  a transfer path for transferring information therethrough;
  a plurality of sets of external terminal groups for inputting the information from external buses to the transfer path and outputting the information from the transfer path to the external buses;
  input/output change-over means for selectively connecting one of the external terminal groups to the transfer path in a first mode and connecting one of the external terminal groups to another of the external terminal groups in a second mode; and
  control means for controlling the input/output change-over means, to select between the first and second modes each of the processors having a common X-directional position being connected to a common one of X buses and each of the processors having a common Y-directional position being connected to a common one of the Y buses, and each of the processors having a common Z directional position being connected to a common one of the Z buses;

the external terminal groups of each of the processors each being coupled with an adjacent one of the bidirectional buses, an adjacent one of the Y buses and an adjacent one of the Z buses.

7. An apparatus according to claim 6, wherein:
each of the plurality of processors includes a monolithic semiconductor integrated circuit;
the processors and the bidirectional X and Y buses are disposed on at least one circuit board in a matrix configuration; and
the bidirectional Z buses include conductors establishing connections between both ends of the circuit board and/or between the circuit boards.

8. An apparatus according to claim 7 including:
a plurality of the circuit boards configured in a stack structure; and
a system control interface section for executing an information transfer between at least one of the bidirectional X, Y, and Z buses and an external input/output device.

9. An apparatus according to claim 8, wherein the control means of each of the plurality of processors includes a memory for storing therein a (system) control instruction loaded from the external input/output device.

* * * * *

UNITED STATES PATENT AND TRADEMARK OFFICE
CERTIFICATE OF CORRECTION

PATENT NO. : 5,408,676
DATED : April 18, 1995
INVENTOR(S) : Kazutaka Mori

It is certified that error appears in the above-indentified patent and that said Letters Patent is hereby corrected as shown below:

Claim 6, column 18, line 6, after the "Z" insert -- - --.

Claim 6, column 18, line 10, after "bidirectional" insert --X--.

Signed and Sealed this

Thirteenth Day of June, 1995

*Attest:*

BRUCE LEHMAN

*Attesting Officer*     *Commissioner of Patents and Trademarks*